(12) United States Patent
Yamane (10) Patent No.: US 9,407,153 B2
(45) Date of Patent: Aug. 2, 2016

(54) SWITCHING POWER SUPPLY SYSTEM

(71) Applicant: FUJI ELECTRIC CO., LTD., Kawasaki-shi, Kanagawa-ken (JP)

(72) Inventor: Hiroki Yamane, Matsumoto (JP)

(73) Assignee: FUJI ELECTRIC CO., LTD., Kawasaki-shi, Kanagawa (JP)

( * ) Notice: Subject to any disclaimer, the term of this patent is extended or adjusted under 35 U.S.C. 154(b) by 1 day.

(21) Appl. No.: 14/054,066

(22) Filed: Oct. 15, 2013

(65) Prior Publication Data
US 2014/0104894 A1    Apr. 17, 2014

(30) Foreign Application Priority Data
Oct. 15, 2012 (JP) .................. 2012-227791

(51) Int. Cl.
*H02M 3/335* (2006.01)
*H02M 1/00* (2006.01)

(52) U.S. Cl.
CPC ...... *H02M 3/33515* (2013.01); *H02M 3/33523* (2013.01); *H02M 2001/0006* (2013.01); *H02M 2001/0032* (2013.01); *Y02B 70/16* (2013.01)

(58) Field of Classification Search
CPC ............. H02M 3/33515; H02M 3/33523; H02M 1/36; H02M 2001/0006; H02M 2001/0032; Y02B 70/16; H05B 33/0887; H05B 41/2983
USPC .............. 363/21.16, 131, 56.11; 323/284; 315/291
See application file for complete search history.

(56) References Cited

U.S. PATENT DOCUMENTS

| | | | | |
|---|---|---|---|---|
| 5,917,716 A | * | 6/1999 | Cho ............... | H02H 7/1227 348/E5.127 |
| 6,147,883 A | * | 11/2000 | Balakrishnan .... | H02M 3/33507 323/315 |
| 7,778,050 B2 | * | 8/2010 | Yamashita ........ | H02M 3/33507 363/21.16 |

(Continued)

FOREIGN PATENT DOCUMENTS

JP    2011-188586 A    9/2011

OTHER PUBLICATIONS

Green Mode PWMIC FA5546/47 (2 Stage OLP Type) Application Note, Fuji Electric Switching Power Supply Control IC, Fuji Electric Co. Ltd., Apr. 2011, English Edition p. 26 (http://www.fujielectric.co,jp/products/semiconductor/). Apr. 2011.

*Primary Examiner* — Jessica Han
*Assistant Examiner* — Demetries A Gibson
(74) *Attorney, Agent, or Firm* — Manabu Kanesaka (57) ABSTRACT

A control circuit controlling the driving of a switching device includes an under voltage lock out circuit stopping the operation of the control circuit when a power supply voltage supplied from the auxiliary winding of an insulating transformer becomes lower than a predetermined power supply lower limit voltage, an FB voltage decision circuit stopping the driving of the switching device when a feedback voltage indicating the state of a load becomes lower than the predetermined threshold value, a flip-flop brought into a set state by an output of the FB voltage decision circuit and a reset state when the power supply voltage exceeds the voltage ensuring the normal operation of the control circuit, and a switching circuit to set the power supply lower limit voltage in the under voltage lock out circuit, lower than that of the normal operation when the flip-flop is set.

8 Claims, 4 Drawing Sheets

(56) References Cited

U.S. PATENT DOCUMENTS

| | | | | |
|---|---|---|---|---|
| 8,064,231 B2 * | 11/2011 | Fang | ................ | H02M 3/33507 363/21.18 |
| 2005/0052886 A1 * | 3/2005 | Yang | ................ | H02M 1/36 363/49 |
| 2005/0259455 A1 * | 11/2005 | Mori | ................ | H02M 3/33507 363/123 |
| 2007/0195559 A1 * | 8/2007 | Gong | ................ | H02M 3/33507 363/21.01 |
| 2009/0134859 A1 * | 5/2009 | Shiroyama | ........ | H02M 3/33507 323/282 |
| 2010/0124081 A1 * | 5/2010 | Morota | ............ | H02M 3/33507 363/21.16 |
| 2010/0315017 A1 * | 12/2010 | Yu | ............ | H02M 1/36 315/291 |

* cited by examiner

SWITCHING POWER SUPPLY SYSTEM

BACKGROUND OF THE INVENTION

1. Field of the Invention

The present invention relates to a switching power supply system that drives a switching device connected in series to the primary winding of an insulating transformer to obtain a specified output voltage from the secondary winding of the insulating transformer, and particularly to a switching power supply system that is provided so that an internal power supply voltage, required for the operation of a control circuit carrying out the switching operation of the switching device, is obtained from an auxiliary winding of the insulating transformer.

2. Background Art

Figure 3:
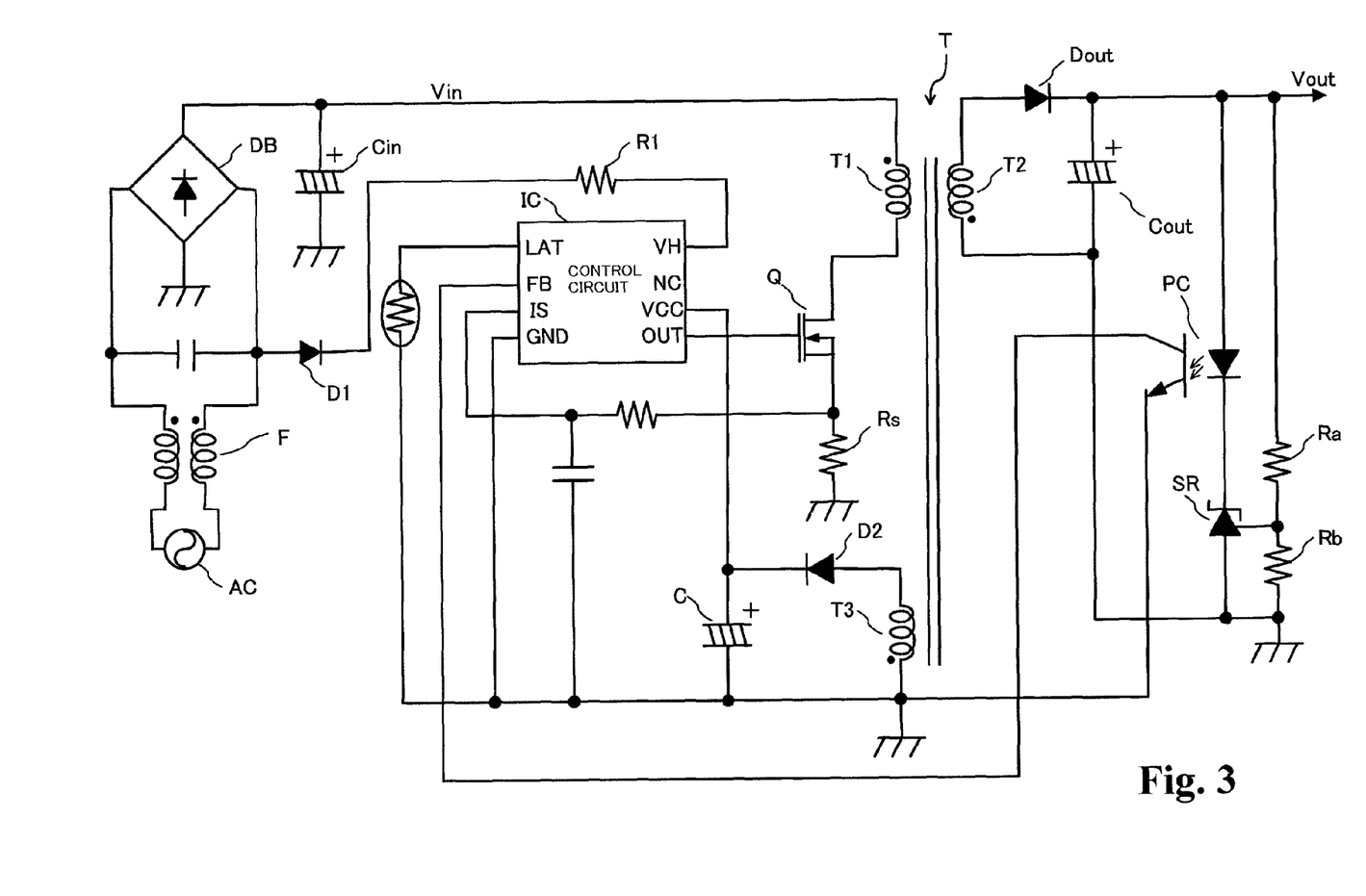
FIG. 3 is a diagram schematically showing the whole configuration of a common flyback switching power supply system.

FIG. 3 is a diagram schematically showing the whole configuration of a common flyback switching power supply system. The switching power supply system is provided with a circuit rectifying and smoothing an AC voltage supplied from an AC power supply through a rectifier circuit of a diode bridge DB and an input capacitor Cin, an insulating transformer T to which a rectified and smoothed input voltage Vin is applied, a switching device Q of a MOSFET, for example, connected in series to the primary winding T1 of the insulating transformer T, and a control circuit IC driving the switching of the switching device Q. By carrying out the switching of the switching device Q, a voltage is produced in the secondary winding T2 of the insulating transformer T and the produced voltage is rectified by an output diode Dout. The rectified voltage is then smoothed by an output capacitor Cout, by which a specified output voltage Vout is obtained.

The control circuit IC driving the switching of the switching device Q is provided with a basic function of carrying out PWM control of the switching frequency of the switching device Q to make the output voltage Vout constant according to a signal IS, corresponding to a current Is flowing in the switching device Q and inputted to an IS terminal, and a feedback signal FB showing load information and inputted to an FB terminal. The signal IS inputted to the IS terminal is detected as a voltage across a sense resistor Rs connected in series to the source of the switching device Q. Specifically, the control circuit IC is provided with functions of controlling the turned-on width of the switching device Q according to the value of the current Is and, along with this, controlling the oscillation frequency of the switching device Q according to the value of the feedback signal FB. Moreover, the control circuit IC plays a role of making the output voltage Vout constant by the controlling functions (see JP-A-2011-188586, for example).

The feedback signal FB is obtained as load information indicating the difference between the value of the output voltage Vout, detected by dividing the output voltage Vout with the series connection of resistors Ra and Rb connected in parallel to a load, and the value of a predetermined output voltage in a shunt regulator SR, for example, connected in parallel to the load.

An increase in the output voltage Vout due to a light load increases a current flowing in a light emitting diode in a photocoupler PC connected in series to the shunt regulator SR to increase an amount of the light emission of the light emitting diode. This increases an amount of the light received by a phototransistor in the photocoupler PC to decrease the on-state resistance thereof, by which the voltage of the feedback signal (load information) FB as the output voltage of the phototransistor becomes lower. Conversely, a decrease in the output voltage Vout due to a heavy load decreases a current flowing in the light emitting diode to decrease an amount of the light emission of the light emitting diode. This decreases an amount of the light received by the phototransistor to increase the on-state resistance thereof, by which the voltage of the feedback signal (load information) FB becomes higher. That is, the feedback signal (load information) FB has a voltage signal that becomes lower when a load is light and becomes higher when the load is heavy and is given to the FB terminal of the control circuit IC from the photocoupler PC.

When the load becomes light and the voltage level of the feedback signal FB is lower, the control circuit IC operates to lower the switching frequency of the switching device Q so as to decrease a power loss in the switching power supply system. The control circuit IC is provided with a function of turning-off the switching device Q to stop the switching operation thereof when the feedback signal is below the predetermined lower limit value.

While, the control circuit IC is formed so as to be provided with a start-up circuit for starting an operation by receiving power inputted from the AC power supply AC to a VH terminal through, for example, a diode D1 and a current limiting resistor R1, and at a stable operation after starting, to be operated with a voltage produced in an auxiliary winding T3 of the insulating transformer T used as a driving power supply voltage. Specifically, the control circuit IC is formed so as to be operated by inputting a winding voltage, produced in the auxiliary winding T3 of the insulating transformer T by the switching operation of the switching device Q, through a rectifying and smoothing circuit formed of a diode D2 and a capacitor C and by producing an internal power supply voltage Vcc from the inputted winding voltage (see "10. Application circuit example", Green Mode PWMIC FA5546/47 (2 Stage OLP Type) Application Note, Fuji Electric Switching Power Supply Control IC, Fuji Electric Co. Ltd., April-2011, English Edition, p. 26, for example).

Moreover, the control circuit IC is provided with an under voltage lock out circuit which stops the operation of the control circuit IC for protecting malfunction thereof when the internal power supply voltage Vcc becomes lower than a predetermined guaranteed operation voltage.

CITATION LIST

Patent Document

Patent Document 1 JP-A-2011-188586.
Non-Patent Document 1 Green Mode PWMIC FA5546/47 (2 Stage OLP Type) Application Note, Fuji Electric Switching Power Supply Control IC, Fuji Electric Co. Ltd., April-2011, English Edition p. 26.

DISCLOSURE OF THE INVENTION

Problem to be Solved by the Invention

Figure 4:
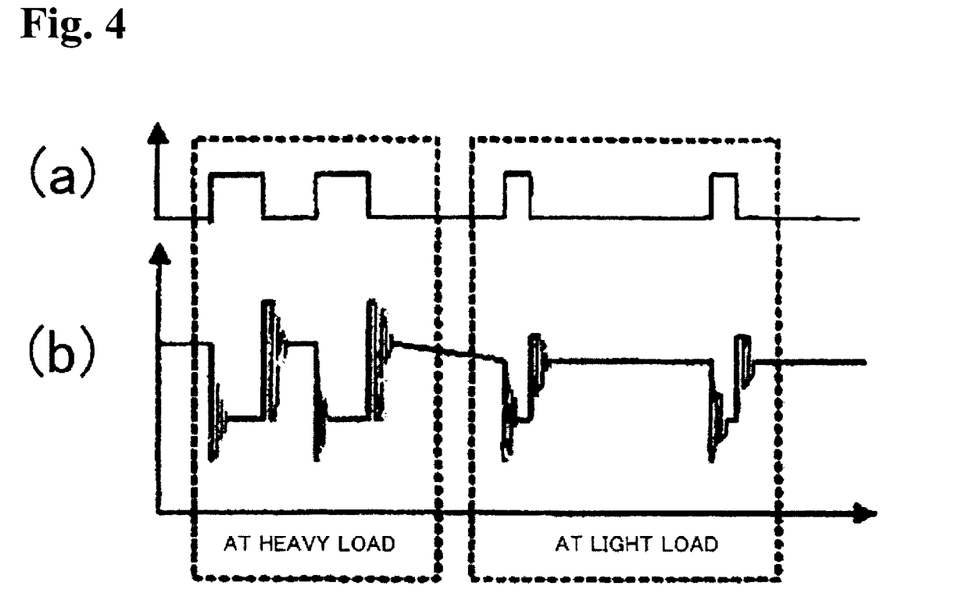
FIG. 4 is a waveform diagram showing the waveforms of driving signal voltages applied to the gate of the switching device in (a) and the waveforms of voltages produced in the auxiliary winding of the insulating transformer in (b) in switching operations at a heavy load and at a light load.

FIG. 4 is a waveform diagram showing the waveforms of driving signal voltages applied to the gate of the switching device Q in (a) and the waveforms of voltages produced in the auxiliary winding T3 of the insulating transformer T in (b) in switching operations at a heavy load and at a light load.

The switching frequency lowered by the control based on the feedback signal FB at a light load lowers the voltage produced in the auxiliary winding T3 of the insulating transformer T and also lowers the peak voltages of ringing voltages generated at turning-on and turning-off of the switching device Q as shown in FIG. 4.

Therefore, the reduction in the internal power supply voltage Vcc, which is produced on the basis of the voltage produced in the auxiliary winding T3, is inevitable when the load is light. Particularly at the light, when the switching frequency of the switching device Q becomes temporarily below the lower limit value and the switching operation is stopped, the internal power supply voltage Vcc further decreases. At this time, the under voltage lock out circuit is operated to occasionally stop the operation of the control circuit IC.

When the operation of the control circuit IC is unwillingly stopped by the operation of the under voltage lock out circuit due to such a temporary stop of the switching operation at the light load, the start-up circuit is operated to restart the control circuit IC. This results in repetition of stopping the operation of the control circuit IC by the under voltage lock out circuit and restarting of the control circuit IC by the start-up circuit, which cause a defective condition of increasing useless power consumption.

The invention was made in view of such a circumstance with an object of providing a switching power supply system that is capable of preventing repetition of the unwilling stop of the operation of the control circuit and the restarting thereof at a light load.

SUMMARY OF THE INVENTION

For achieving the foregoing object, a switching power supply system according to the invention includes a switching power supply system main body carrying out switching of a switching device connected in series to the primary winding of an insulating transformer to which an input voltage is applied, and rectifying a voltage produced in the secondary winding of the insulating transformer to obtain a specified output voltage, and a control circuit operated by receiving an internal power supply voltage produced from the voltage produced in the auxiliary winding of the insulating transformer after being made started the operation thereof with a specified voltage applied, in which the control circuit particularly includes:

an under voltage lock out circuit stopping the operation of the control circuit when the voltage supplied from the auxiliary winding becomes lower than a predetermined power supply lower limit voltage;

a feedback voltage decision circuit stopping the driving of the switching device when a feedback voltage indicating the error between the predetermined value of the output voltage and the value of the output voltage becomes lower than the predetermined threshold value;

a flip-flop brought into a set state by an output of the feedback voltage decision circuit and, along with this, brought into a reset state when the voltage supplied from the auxiliary winding exceeds the voltage guaranteeing the normal operation of the control circuit; and a switching circuit establishing when the flip-flop is brought into a set state the power supply lower limit voltage in the under voltage lock out circuit lower than the power supply lower limit voltage established when the power supply switching system is in the normal operation.

The switching power supply system is preferably formed so that the switching circuit selects according to the output of the flip-flop either a first power supply lower limit voltage preventing the switching device from a malfunction when the switching power supply system is in the normal operation or a second power supply lower limit voltage established lower than the first power supply lower limit voltage to establish the selected one in the under voltage lock out circuit.

It is preferable that a comparator, comparing the voltage supplied from the auxiliary winding with an operation guaranteeing voltage in producing the internal power supply voltage, is to detect whether or not the voltage supplied from the auxiliary winding is the voltage guaranteeing the normal operation of the control circuit.

Moreover, the control circuit is to carry out pulse-width modulation control on the switching period of the switching device according to the feedback voltage.

According to the switching power supply system with the foregoing configuration, when the voltage level of the feedback signal is temporarily lowered at a light load to cause accompanied stopping of a switching operation, the power supply lower limit voltage established in the under voltage lock out circuit is established lower than that at a normal operation. Therefore, even though the winding voltage obtained from the auxiliary winding of the insulating transformer is temporarily lowered with the temporary stopping of the switching operation, the under voltage lock out circuit is operated to cause no stopping of the operation of the control circuit itself. Thus, it becomes possible to prevent repetition of the unwilling stop of the operation of the control circuit and the restarting thereof at a light load to ensure a stable operation of the switching power supply system.

In particular, the control circuit of the switching power supply system has a simple configuration of being provided with the flip-flop, which is brought into a set state by the output of the FB voltage decision circuit and brought into a reset state when the voltage applied at a starting up reaches the voltage guaranteeing the normal operation of the control circuit and, when the flip-flop is brought into the set state, making the power supply lower limit voltage, established in the under voltage lock out circuit, lower than that established at a normal operation. With such a simple configuration, a stable operation of the switching power supply can be ensured.

DESCRIPTION OF THE PREFERRED EMBODIMENT

In the following, a switching power supply system according to an embodiment of the invention will be explained with reference to the attached drawings.

The switching power supply system is entirely formed as is shown in FIG. 3 with a main unit of the switching power supply system, formed of a switching device Q and an output circuit, provided as a principal component and with a control circuit IC carrying out switching control of the switching device Q included therein. The switching device Q is connected in series to the primary winding T1 of an insulating transformer T to which an input voltage Vin is applied, and the output circuit rectifies a voltage produced in a secondary winding T2 of an insulating transformer T to obtain a specified output voltage.

The control circuit IC is formed so as to be operated by an internal power supply voltage Vcc produced from the voltage produced in an auxiliary winding T3 after the control circuit IC is started into operation with a specified voltage applied thereto. The control circuit IC is basically formed with a function provided for carrying out PWM control of the switching frequency of the switching device Q to make the output voltage Vout constant according to a current Is flowing in the switching device Q and a feedback signal FB indicating load information.

The control circuit IC, in addition to the foregoing control function of making the output voltage Vout constant, is formed with an under voltage lock out circuit UVLO and an FB voltage decision circuit OFF-FB further provided. As will be explained later in details, the under voltage lock out circuit UVLO stops the operation of the control circuit IC when the voltage supplied from the auxiliary winding T3 of the insulating transformer T for producing the internal power supply voltage Vcc becomes lower than the predetermined power supply lower limit voltage and the FB voltage decision circuit OFF-FB stops the driving of the switching device Q when the voltage of the feedback signal indicating the error between the value of the predetermined output voltage and the value of the output voltage Vout becomes lower than the predetermined threshold voltage.

Figure 1:
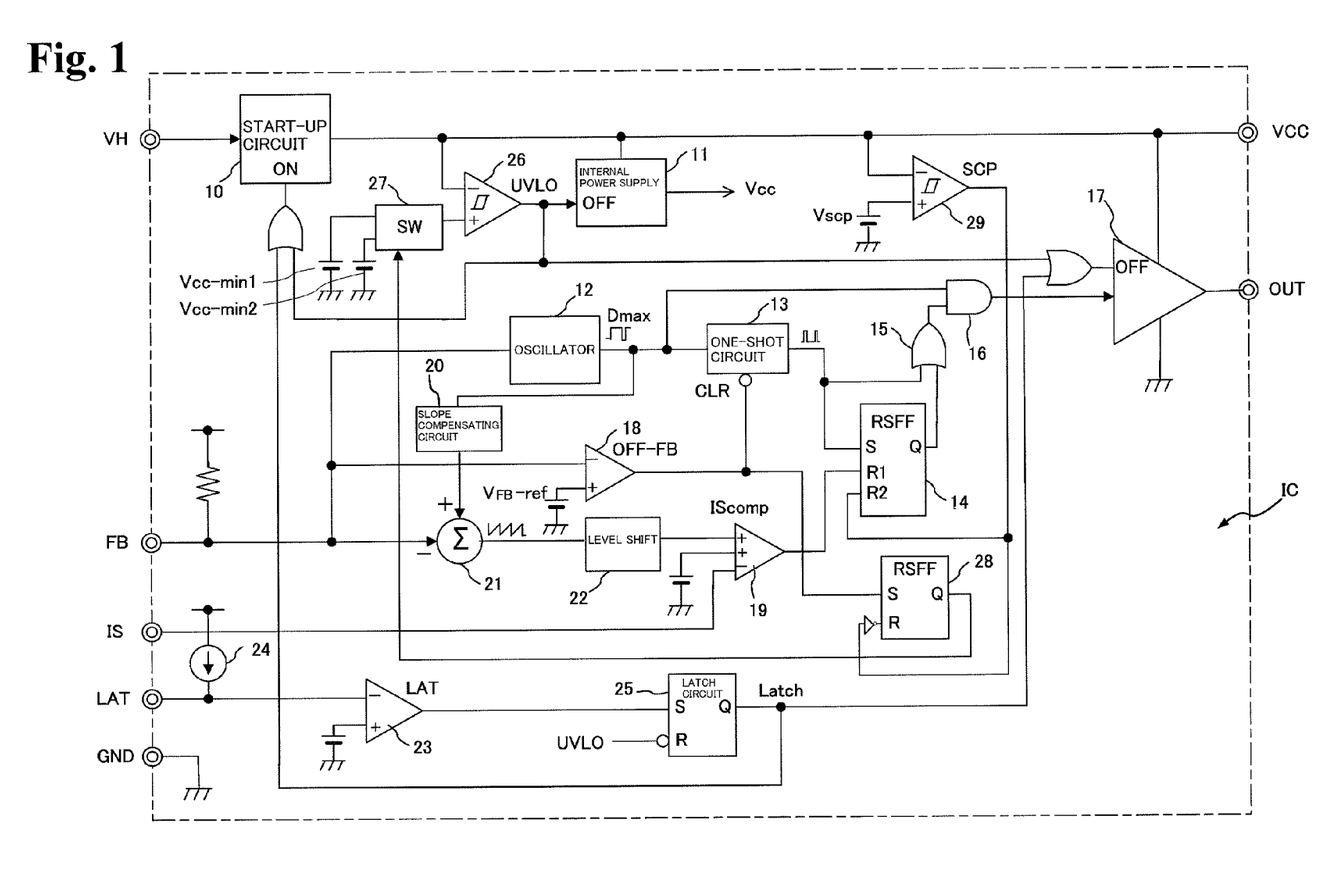
FIG. 1 is a diagram schematically showing the configuration of a control circuit in a switching power supply system according to an embodiment of the invention.

FIG. 1 is a diagram schematically showing the configuration of a control circuit IC in a switching power supply system according to an embodiment of the invention which circuit is formed with foregoing basic functions provided. With reference to FIG. 1, the basic function of the control circuit IC will be explained first.

In FIG. 1, a start-up circuit 10 receives a voltage supplied to a VH terminal from the AC power supply through the diode D1 and the current limiting resistor R1, for example, as shown in FIG. 3. Moreover, an internal power supply 11 receives a winding voltage, which is produced in the auxiliary winding T3 of the insulating transformer T, charges the capacitor C (see FIG. 3) and is inputted to the control circuit IC through the VCC terminal. The internal power supply 11 then produces an internal power supply voltage Vcc necessary for the operation of the control circuit IC. Every component in the control circuit IC that will be explained in the following is operated with the internal power supply voltage Vcc used as the voltage source thereof.

Furthermore, an oscillator 12 is to determine a switching frequency for the switching device Q. At a normal operation, the oscillator 12 generates a pulsed signal with a predetermined switching frequency (60 kHz, for example). The oscillator 12 is provided with a switching frequency controlling function which works, when the voltage level of the feedback signal FB given to an FB terminal is lowered, to approximately linearly lower the switching frequency down to the lowest frequency (340 Hz, for example) according to the extent of the lowered voltage. At this switching frequency, the value of the switching period of the switching device Q is limited to the maximum value Dmax.

The output of the oscillator 12 is inputted as a setting signal to an PS flip-flop 14 for PWM control through a one-shot circuit 13 that specifies the minimum turned-on width of the switching device Q. The RS flip-flop 14 is to be brought into a reset state by receiving an output of an IS current comparator 19 that will be explained later when the current Is flowing in the switching device Q reaches a specified value. Thus, the RS flip-flop 14 plays a role of determining the turned-on width of the switching device Q.

In particular, the RS flip-flop 14 is forcibly operated by a pulsed signal of a constant time width, outputted from the one-shot circuit 13, inputted as a setting signal. Moreover, the foregoing RS flip-flop 14 forcibly outputs a pulsed signal satisfying the minimum turned-on width of the switching device Q. Also, the RS flip-flop 14 is reset by the current IS when the pulse width exceeds the pulse width for a predetermined time (the minimum tuned-on width of the switching device Q).

The output of the RS flip-flop 14, after being ORed with the output of the one-shot circuit 13 by an OR circuit 15, is subjected to ORed by Dmax signal (maximum duty) of the output of the oscillator 12 through an AND circuit 16 to be inputted to a driver circuit 17. The OR circuit 15 plays a role of producing a blanking signal from the output of the one-shot circuit 13. Moreover, the AND circuit 16 further plays a role of determining the maximum duty for switching the switching device Q. In addition, the driver circuit 17 produces a driving signal for turning-on and -off the switching device Q according to the input voltage thereto. The turning-on and -off driving signal is applied to the gate of the switching device Q through an OUT terminal, by which the switching driving of the switching device Q is carried out.

Incidentally, the one-shot circuit 13 is forced to be brought into a reset state when receiving the output signal of an FB voltage comparator 18 carrying out comparison of the voltage level of the feedback signal FB with the predetermined voltage level of the decision threshold value $V_{FB}$-ref. The FB voltage comparator 18 plays a role as the foregoing FB voltage decision circuit OFF-FB to reset the one-shot circuit 13 with the signal outputted when the voltage level of the feedback signal FB becomes lower than the voltage level of the decision threshold value $V_{FB}$-ref due to a no load state, for example. The resetting stops the outputting of the setting signal from the one-shot circuit 13 to the RS flip-flop 14 to inhibit the driving of the driver circuit 17, by which the driving of the switching device Q is stopped. By the function of the FB voltage decision circuit OFF-FB (FB voltage comparator 18), a useless switching operation of the switching device Q is stopped for reducing power consumption because of switching operation term and stopping term.

Here, the previously described resetting of the RS flip-flop 14 by the current Is will be briefly explained. The current Is flowing in the switching device Q is monitored by the IS current comparator 19. The IS current comparator 19 compares a predetermined current limiting threshold value for detecting an overcurrent and the maximum current limiting threshold value produced according to the voltage level of the feedback signal FB with a voltage corresponding to the current Is flowing in the switching device Q which voltage is detected through the sensing resistor Rs (see FIG. 3) and is inputted through the IS terminal. The IS current comparator 19 outputs a resetting signal to the RS flip-flop 14 when the voltage corresponding to the current Is exceeds the current limiting threshold value or the maximum current limiting threshold value to thereby play a role of determining the timing of turning-off the switching device Q.

Incidentally, the maximum current limiting threshold value is produced by inputting the Dmax (maximum duty) signal of the oscillator 12 to a slope compensating circuit 20 to produce a sawtooth wave signal, by adding the sawtooth wave signal to the feedback signal FB in an adder 21, and then by carrying out the level shift 22 of the output of the adder 21. With the maximum current limiting threshold value established according to the feedback signal FB in this way, the current Is flowing in the switching device Q is made increased when the output voltage Vout is lowered, for example, to thereby carry out control of keeping the output voltage Vout constant.

A LAT terminal for inputting an external latch signal is connected to a comparator 23 comparing the voltage at the LAT terminal with a predetermined reference voltage. The LAT terminal is to be used for soft starting of the control circuit IC with a capacitor (not shown), for example, externally connected thereto, for which a function is provided which charges the capacitor with a constant current by a constant current source 24. The voltage produced at the LAT terminal due to the charge of the externally connected capacitor is compared with the reference voltage by the comparator 23 to bring the latch circuit 25 into a set state when the voltage at the LAT terminal is lower than the reference voltage, by which on-off control of the operation of the starting circuit 10 is carried out. Moreover, by controlling the operation of the driver circuit 17 by the output of the comparator 23, the period of driving the turning-on of the switching device Q is gradually increased.

In the next, characteristic functions provided in the control circuit IC according to the embodiment will be explained. As was explained in the foregoing, the control circuit IC is provided with the internal power supply 11 producing an internal power supply voltage Vcc on the basis of a winding voltage produced in the auxiliary winding T3 of the insulating transformer T and supplied through the VCC terminal. However, when the winding voltage is decreased, with which the internal power supply 11 becomes incapable of producing the internal power supply voltage Vcc necessary for operating the control circuit IC, there is a possibility of causing a faulty operation of the control circuit IC. For preventing a faulty operation accompanied with such a decrease in the winding voltage, the control circuit IC is provided with the under voltage lock out circuit UVLO which monitors a voltage (winding voltage) supplied through the VCC terminal.

The under voltage lock out circuit UVLO is actualized by a comparator 26 outputting an operation stopping signal when the voltage applied from the auxiliary winding T3 through the diode D2 (see FIG. 3) to the VCC terminal (winding voltage) becomes lower than the predetermined power supply lower limit voltage (lowest operation guaranteeing voltage). The operation stopping signal is given to the driver circuit 17 to stop the operation of the driver circuit 17 and, along with this, is given to the starting circuit 10 to be used for restarting the start-up circuit 10. The operation stopping signal is further used as a resetting signal of the latch circuit 25.

Here, the control circuit IC is characterized in that the power supply lower limit voltage established in the comparator 26 is made to be different between at a normal load (at a heavy load) and at a light load. In particular, the control circuit IC is characterized by being formed so that instead of a first power supply lower limit voltage Vcc-min1 to be established at a normal load, a second power supply lower limit voltage Vcc-min2 lower than the first power supply lower limit voltage Vcc-min1 (<Vcc-min1) is established at a light load in the comparator 26 through a switching circuit 27 the switching of which is controlled according to the state of a load.

Incidentally, the detection of a light load state is carried out with the use of the FB voltage comparator 18. Namely, in a light load state, the voltage of the feedback signal FB lowers to become below the decision threshold value $V_{FB}$-ref. At this time, the FB voltage comparator 18 outputs a signal to bring an RS flip-flop 28 for light load detection into the set state of outputting a signal, by which a light load state is detected. Moreover, the resetting of the RS flip-flop 28 is carried out by using the output of a comparator 29 which detects that the voltage applied to the VCC terminal (winding voltage), for example, exceeds an operation ensuring voltage Vscp ensuring the operation of the control circuit IC.

The comparator 29 is formed of a comparator forming a load short circuit protection (SCP) circuit, for example, independent of the comparator 26 forming the under voltage lock out circuit UVLO explained in the foregoing. The load short circuit protection (SCP) circuit originally plays a role of detecting that no power comes to be supplied from the auxiliary winding T3 by a short circuit of a load to cause a sudden decrease in the voltage at the VCC terminal and stopping the operation of the driver circuit 17. Specifically, the comparator 29 forming the load short circuit protection (SCP) circuit plays a role of bringing the RS flip-flop 14 into a reset state before a protecting operation against an overload starts to thereby promptly stop the operation of the driver circuit 17.

In particular, in the embodiment, by using that the comparator 29, detecting the winding voltage to carry out a protecting operation against a load short circuit as was explained in the foregoing, has a specified hysteresis characteristic and that the output of the comparator 29 becomes active when the voltage supplied to the VCC terminal is equal to or higher than the operation ensuring voltage Vscp which is sufficiently high for producing the internal power supply voltage Vcc, the output of the comparator 29 is used for resetting the RS flip-flop 28 for detecting a light load.

Thus, according to the control circuit IC, which is provided with the RS flip-flop 28 for a light load detection and is formed so that the power supply lower limit voltage established in the comparator 26 in the under voltage lock out circuit UVLO is switched between a normal operation and a light load by the output of the RS flip-flop 28 as was explained in the foregoing, the operation of the under voltage lock out circuit UVLO at a light load is eliminated which operation causes an unwilling stop of the operation of the control circuit IC.

Figure 2:
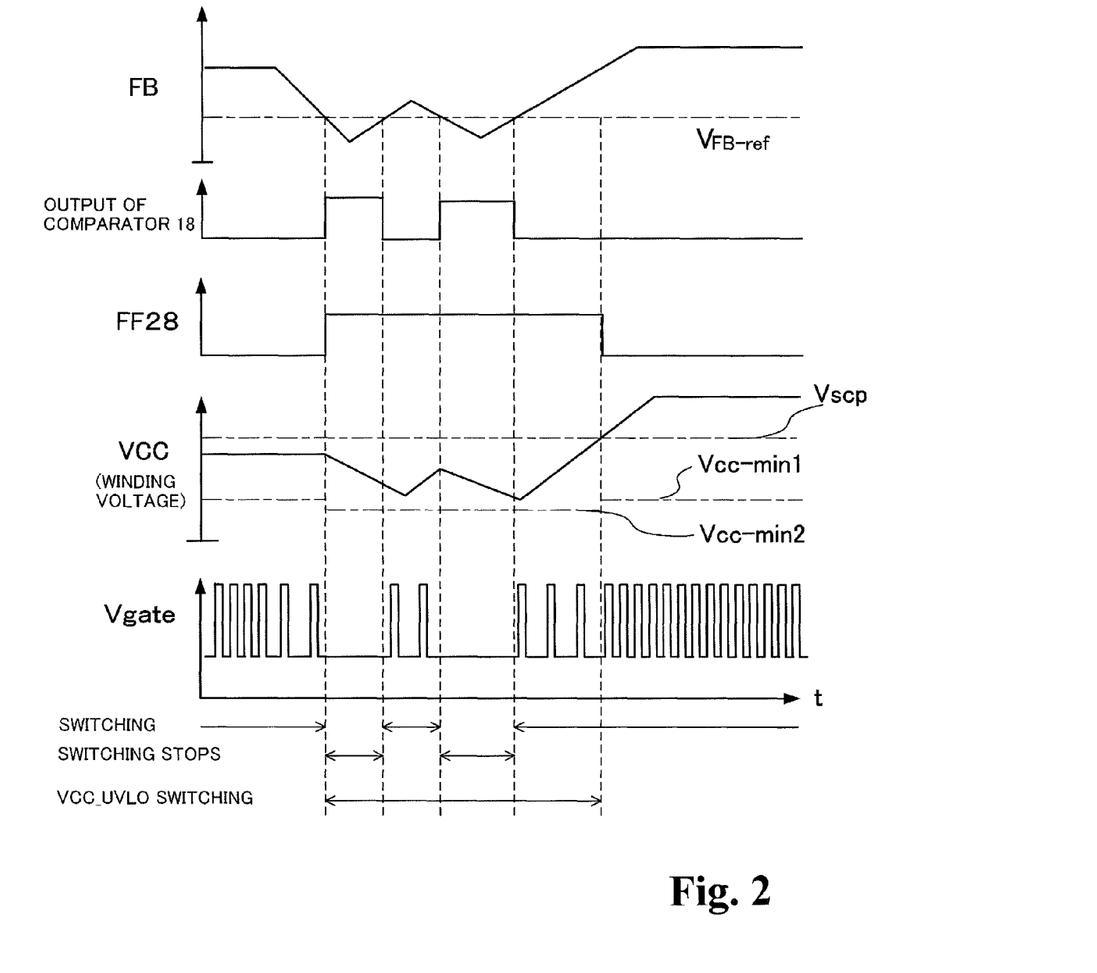
FIG. 2 is a waveform diagram showing waveforms of signals for explaining the operations of the control circuit IC shown in FIG. 1.

FIG. 2 is a waveform diagram showing waveforms of signals for explaining the operations of the control circuit IC shown in FIG. 1.

Namely, as is shown in the waveform diagram in FIG. 2, when the voltage level of the feedback signal FB decreases at a light load to be lower than the decision threshold value VFB-ref thereof, the FB voltage comparator 18 outputs a signal to the one-shot circuit 13 and the RS flip-flop 28. With this, the one-shot circuit 13 is brought into a reset state to stop the switching driving of the switching device Q and the RS flip-flop 28 is brought into a set state to output a signal to the switching circuit 27. Then, the switching circuit 27, receiving the output signal from the RS flip-flop 28, carries out the switching operation of substituting the first power supply lower limit voltage Vcc-min1, which has been selected at a normal operation and has been established in the comparator 26 of the under voltage lock out circuit UVLO, by the second power supply lower limit voltage Vcc-min2 lower than the first power supply lower limit voltage Vcc-min1 and establishing the second power supply lower limit voltage Vcc-min2 in the comparator 26. FIG. 2 is a waveform diagram showing waveforms of signals for explaining the operations of the control circuit IC shown in FIG. 1. Namely, as is shown in the waveform diagram in FIG. 2, when the voltage level of the feedback signal FB decreases at a light load to be lower than the decision threshold value VFB-ref thereof, the FB voltage comparator 18 outputs a signal to the RS flip-flop 28, with which the RS flip-flop 28 is brought into a set state to output a signal to the switching circuit 27. Then, the switching circuit 27, receiving the output signal from the RS flip-flop 28, carries out the switching operation of substituting the first power supply lower limit voltage Vcc-min1, which has been selected at a normal operation and has been established in the comparator 26 of the under voltage lock out circuit UVLO, by the second power supply lower limit voltage Vcc-min2 lower than the first power supply lower limit voltage Vcc-min1 and establishing the second power supply lower limit voltage Vcc-min2 in the comparator 26.

As a result, even though the winding voltage supplied to the VCC terminal is lowered with the stopping of the switching driving of the switching device Q, the lowered winding voltage is to be compared with the second power supply lower limit voltage Vcc-min2. Therefore, even though the switching operation of the switching device Q is stopped, the winding voltage lowered with the stopping is not compared with the first power supply lower limit voltage Vcc-min1 at a normal operation, but is to be compared with the second power supply lower limit voltage Vcc-min2 for the operation at a light load to thereby eliminate an instantaneous stop of the operation of the control circuit IC.

In such a state, the stopping of the switching operation of the switching device Q lowers the output voltage Vout (see FIG. 3) to result in accompanied recovery in the voltage level of the feedback signal FB. Then, the voltage level of the feedback signal FB exceeding the decision threshold value $V_{FB}$-ref causes the FB voltage comparator 18 to output no signal. This cancels the reset state of the one-shot circuit 13 to allow the switching device Q to restart the switching operation thereof. The RS flip-flop 28 also comes to have no signal from the FB voltage comparator 18 as a set signal thereto. However, since no reset signal is inputted to the RS flip-flop 28, the RS flip-flop 28 is kept in the set state to continue to output the signal of establishing the second power supply lower limit voltage Vcc-min2 in the comparator 26 to the switching circuit 27.

Thereafter, the restart of the switching operation of the switching device Q causes an accompanied increase in the output voltage Vout to bring the voltage level of the feedback signal FB to be lower than the decision threshold value $V_{FB}$-ref again. This makes the FB voltage comparator 18 output a signal to the one-shot circuit 13 and the RS flip-flop 28 again. Thus, the one-shot circuit 13 is brought into a reset state again, by which the switching operation of the switching device Q is stopped. While, the FB voltage comparator 18 is kept in the set state thereof to further continue to output the signal of establishing the second power supply lower limit voltage Vcc-min2 in the comparator 26 to the switching circuit 27. After this, such an operation is repeated. Therefore, at a light load, the switching operations of the switching device Q are intermittently carried out, by which power conversion is to be performed.

However, a load that becomes heavy when the switching device Q restarts the switching operation thereof results in an accompanied gradual increase in the voltage level of the feedback signal FB. Moreover, when a voltage produced in the auxiliary winding T3 is increased by the restart of the switching operation of the switching device Q to allow a voltage supplied to the VCC terminal to reach a voltage sufficient to produce the internal power supply voltage Vcc in the internal power supply 11, specifically when the voltage at the VCC terminal exceeds the operation ensuring voltage Vscp established in the comparator 29 forming the load short circuit protection (SCP) circuit, the output of the comparator 29 brings the RS flip-flop 28 into a reset state of outputting no signal to the switching circuit 27.

As a result, the switching circuit 27 selects the first power supply lower limit voltage Vcc-min1 to be established at a normal load instead of the second power supply lower limit voltage Vcc-min2 established at a light load and establishes the selected first power supply lower limit voltage Vcc-min1 in the comparator 26 in the under voltage lock out circuit UVLO. Thus, the comparator 26 is made to monitor the voltage at the VCC terminal (winding voltage) under the first power supply lower limit voltage Vcc-min1.

In the period during which the operation of the control circuit IC is made continued in this way with the voltage decision threshold value that is established at a light load in the comparator 26 switched to the second power supply lower limit voltage Vcc-min2 lower than the first power supply lower limit voltage Vcc-min1 established at a normal operation, the FB voltage comparator 18 continues to monitor the voltage level of the feedback signal FB. Thus, only when the voltage level of the feedback signal FB lowers to be less than the decision threshold value $V_{FB}$-ref, the FB voltage comparator 18 is to reset the one-shot circuit 13 to temporarily stop the switching operation of the switching device Q.

Namely, the stopping of the switching operation of the switching device Q causes a load to become heavy. Along with this, the voltage level of the feedback signal FB increases to restart the switching operation of the switching device Q at the time when the voltage level exceeds the decision threshold value $V_{FB}$-ref. Hence, the switching device Q is continuously subjected to on-off control with the switching operation thereof intermittently carried out according to the voltage level of the feedback signal FB to perform power conversion through the insulating transformer T.

Therefore, as was explained in the foregoing, the control circuit IC is formed so that the second power supply lower limit voltage Vcc-min2, lower than the first power supply lower limit voltage Vcc-min1 for at a heavy load, is established at a light load instead of the first power supply lower limit voltage Vcc-min1 as the voltage decision threshold value established in the comparator 26 depending on the voltage level of the feedback signal FB. Thus, according to the control circuit IC, a malfunction of causing unwilling stop of the control circuit IC at a light load can be prevented from occurring.

In addition, in the control circuit IC, as was explained in the foregoing, the output of the FB voltage comparator 18 that monitors the voltage level of the feedback signal FB is used for setting the RS flip-flop 28 to provide an output, and the output of the comparator 29 forming the load short circuit protection (SCP) circuit that monitors the voltage at the VCC terminal (winding voltage) is used for resetting the RS flip-flop 28 to provide no output. Moreover, the control circuit IC is formed so that the switching circuit 27 is switched according to the presence or absence of the output from the RS flip-flop 28 to change the voltage decision threshold value established in the comparator 26 in the under voltage lock out circuit UVLO. Accordingly, with a simple configuration of providing the RS flip-flop 28 and the switching circuit 27, the control circuit IC can be reliably prevented from an unwilling stop of the operation at a light load. As a result, despite the simple configuration, it becomes possible to prevent the control circuit IC from a repetition of stops and restarts of operations and to eliminate uselessly forced power consumption from the control circuit IC with great practical effects.

The invention is not limited to the embodiment explained in the foregoing. For example, with respect to the circuit configuration actualizing the basic functions of the control circuit IC, circuit configurations having been previously proposed can be adopted as required. What is essential is that the circuit is sufficiently formed by using the RS flip-flop 28, which is brought into the set state according to the voltage level of the feedback signal FB and brought into the reset state when the voltage at the VCC terminal (winding voltage) increases, so that the voltage decision threshold value at a light load is established to be lower than the threshold value at a normal operation in the under voltage lock out circuit UVLO. The levels of the voltage decision threshold values established in the under voltage lock out circuit UVLO are also sufficiently determined according to the specification thereof. In addition, the invention can be made while being variously modified within a range without departing from the spirit and scope of the present invention.

What is claimed is:

1. A switching power supply system comprising:
   a switching power supply system main body switching a switching device connected in series to a primary winding of a transformer applied with an input voltage, and rectifying a voltage generated in a secondary winding of the transformer to obtain a predetermined output voltage; and
   a control circuit receiving an internal power supply voltage generated from the voltage generated in an auxiliary winding of the transformer after applying specified voltage and controlling the switching of the switching device,
   wherein the control circuit comprises:
   an under voltage lock out circuit stopping the operation of the control circuit while the voltage supplied from the auxiliary winding is lower than a predetermined power supply lower limit voltage;
   a feedback voltage decision circuit stopping the driving of the switching device when a feedback voltage, which indicates an error between a predetermined value of the output voltage and the value of the output voltage, is lower than a predetermined threshold value;
   a flip-flop set by an output of the feedback voltage decision circuit, and reset when the voltage supplied from the auxiliary winding exceeds the voltage ensuring a normal operation of the control circuit; and
   a switching circuit to set the power supply lower limit voltage in the under voltage lock out circuit, lower than that of the normal operation when the flip-flop is set.

2. The switching power supply system according to claim 1, wherein the switching circuit is configured to select either a first power supply lower limit voltage preventing a malfunction of the switching device in the normal operation, or a second power supply lower limit voltage set lower than the first power supply lower limit voltage, according to the output of the flip-flop to set the under voltage lock out circuit.

3. The switching power supply system according to claim 1, further comprising a comparator comparing the voltage supplied from the auxiliary winding with an operation ensuring voltage to produce the internal power supply voltage, to detect whether the voltage supplied from the auxiliary winding is the voltage ensuring the normal operation of the control circuit.

4. The switching power supply system according to claim 1, wherein the control circuit controls a pulse-width modulation on a switching period of the switching device according to the feedback voltage.

5. The switching power supply system according to claim 1, wherein the under voltage lock out circuit includes a comparator receiving a first power supply lower limit voltage or a second power supply lower limit voltage lower than the first power supply lower limit voltage, and operating such that instead of the first power supply lower limit voltage, the second power supply lower limit voltage is established in the comparator at a predetermined load in the switching power supply system through the switching circuit and the feedback voltage decision circuit, so that an operation of the under voltage lock out circuit at the second power supply lower limit is eliminated to prevent unwilling stop of the control circuit.

6. The switching power supply system according to claim 5, further comprising:
   a driver circuit to turn-on and turn-off the switching device, and
   another comparator forming a load short circuit protection circuit and connected to the driver circuit, the another comparator detecting a state in which no power is supplied from the auxiliary winding due to a short circuit of a load causing a sudden decrease in a voltage at a VCC terminal, and stopping an operation of the driver circuit upon detection.

7. The switching power supply system according to claim 1, wherein the control circuit further comprises a driver circuit for the switching device, and a start-up circuit, an operation stopping signal from the under voltage lock out circuit being supplied to the driver circuit and the starting circuit.

8. The switching power supply system according to claim 7, wherein the switching circuit includes a first lower limit voltage for preventing a malfunction of the switching device in the normal operation, and a second lower limit voltage lighter than the first lower limit for preventing a malfunction of the switching device in an operation lighter than the normal operation, the switching circuit setting the under voltage lock out circuit to the first lower limit voltage or the second lower limit voltage according to the output of the flip-flop from the feedback voltage decision circuit.

* * * * *